(12) United States Patent
Fujinaka

(10) Patent No.: US 8,953,253 B2
(45) Date of Patent: Feb. 10, 2015

(54) LENS BARREL

(71) Applicant: Panasonic Corporation, Osaka (JP)

(72) Inventor: Hiroyasu Fujinaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/173,057

(22) Filed: Feb. 5, 2014

(65) Prior Publication Data

US 2014/0153112 A1 Jun. 5, 2014

Related U.S. Application Data

(63) Continuation of application No. PCT/JP2012/007247, filed on Nov. 12, 2012.

(30) Foreign Application Priority Data

Nov. 11, 2011 (JP) .................. 2011-247173

(51) Int. Cl.
*G02B 15/14* (2006.01)
*G02B 7/02* (2006.01)
(Continued)

(52) U.S. Cl.
CPC ........ *G02B 7/04* (2013.01); *G02B 15/14* (2013.01); *G02B 7/102* (2013.01); *G02B 7/08* (2013.01)
USPC ............ 359/699; 359/700; 359/694; 359/823

(58) Field of Classification Search
CPC .......... G02B 7/02; G02B 7/021; G02B 7/023; G02B 7/10; G02B 7/102; G02B 15/14; G03B 13/00; G03B 17/04
USPC .................... 359/819, 822–826, 694–704; 396/72–75, 83, 89, 90, 97, 453, 529; 348/374
See application file for complete search history.

(56) References Cited

U.S. PATENT DOCUMENTS 5,701,523 A 12/1997 Omiya et al.
6,198,578 B1 * 3/2001 Iwasa et al. .................. 359/699
(Continued)

FOREIGN PATENT DOCUMENTS

JP H09-189844 A 7/1997
JP 2000-292845 A 10/2000
(Continued)

OTHER PUBLICATIONS

International Search Report for corresponding International Application No. PCT/JP2012/007247, mailed Feb. 12, 2013.

*Primary Examiner* — Loha Ben
(74) *Attorney, Agent, or Firm* — Renner, Otto, Boisselle & Sklar, LLP

(57) ABSTRACT

The present lens barrel is provided with a cylindrical moving frame and a cylindrical cam frame disposed on the inner periphery of the moving frame. The cylindrical moving frame has a first cam follower and a second cam follower. The first cam follower projects radially from the inner peripheral surface or the outer peripheral surface. The second cam follower projects radially further from the top of the first cam follower. The cylindrical cam frame is disposed on the inner periphery or the outer periphery of the moving frame, and has a first cam and a second cam on the outer peripheral surface side or the inner peripheral surface side. The first cam engages with the first cam follower, and has a cam surface only on the image plane side in the optical axis direction. The second cam is formed on the bottom surface of the first cam, and engages with the second cam follower.

16 Claims, 11 Drawing Sheets

(51) Int. Cl.
  *G02B 7/04* (2006.01)
  *G02B 7/10* (2006.01)
  *G02B 7/08* (2006.01)

(56) References Cited

U.S. PATENT DOCUMENTS

| | | | | |
|---|---|---|---|---|
| 6,373,641 B2 * | 4/2002 | Koiwai | ........................... | 359/700 |
| 6,570,718 B2 * | 5/2003 | Nomura et al. | ................ | 359/699 |
| 6,751,031 B2 * | 6/2004 | Yasutomi | ....................... | 359/819 |
| 7,088,523 B2 * | 8/2006 | Hamasaki et al. | ............. | 359/694 |
| 7,839,583 B2 * | 11/2010 | Kaneko et al. | ................. | 359/819 |
| 8,068,287 B2 * | 11/2011 | Sato | ............................... | 359/700 |
| 8,077,409 B2 | 12/2011 | Iwasaki | | |
| 8,218,249 B2 * | 7/2012 | Yamauchi et al. | ............ | 359/699 |
| 8,411,372 B2 * | 4/2013 | Kudoh | ........................... | 359/700 |
| 8,456,755 B2 * | 6/2013 | Shinano et al. | ................ | 359/700 |
| 8,547,647 B2 * | 10/2013 | Shinano et al. | ................ | 359/700 |
| 8,699,148 B2 * | 4/2014 | Kuwahara et al. | ............ | 359/700 |
| 8,780,456 B2 * | 7/2014 | Shinano et al. | ................ | 359/700 |
| 2002/0005993 A1 | 1/2002 | Koiwai | | |
| 2010/0053780 A1 | 3/2010 | Iwasaki | | |

FOREIGN PATENT DOCUMENTS

| | | | |
|---|---|---|---|
| JP | 2001-100082 | A | 4/2001 |
| JP | 2001-235673 | A | 8/2001 |
| JP | 2002-23036 | A | 1/2002 |
| JP | 2010-26322 | A | 2/2010 |
| JP | 2010-54645 | A | 3/2010 |

* cited by examiner

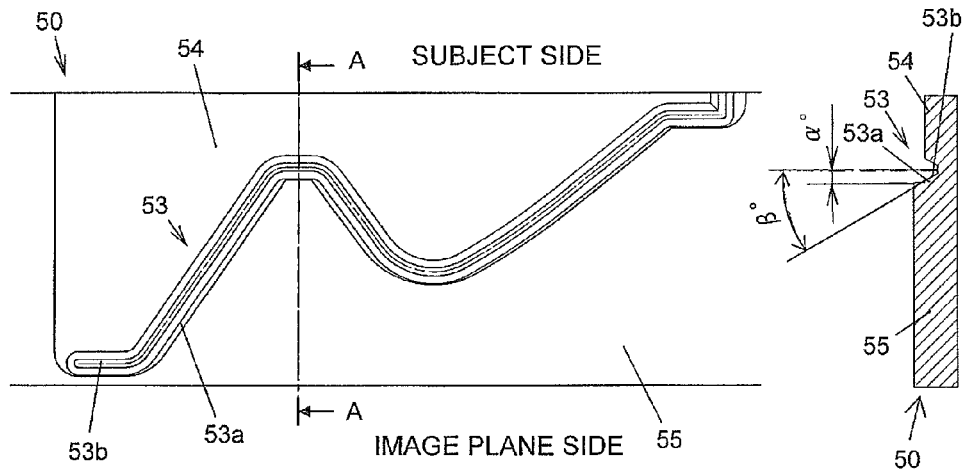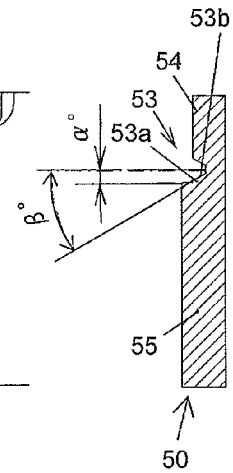
FIG. 10A-1    FIG. 10A-2
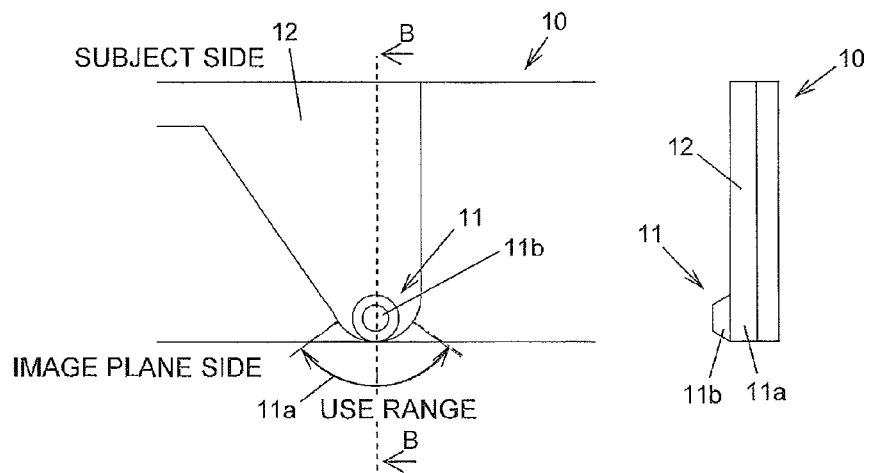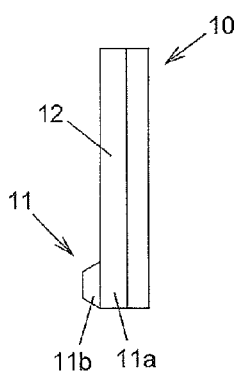
FIG. 10B-1    FIG. 10B-2

LENS BARREL

CROSS-REFERENCE TO RELATED APPLICATIONS

This application claims priority to Japanese Patent Applications No. 2011-247173 filed on Nov. 11, 2011. The entire disclosure of Japanese Patent Applications No. 2011-247173 is hereby incorporated herein by reference.

BACKGROUND

The technology disclosed herein relates to a lens barrel used in an image-capturing device.

Retractable lens barrels used in image-capturing devices are typically provided with a cam mechanism configured with a cam follower and a cam coupled to the cam follower. In such lens barrels, the cam mechanism is activated mechanically or electrically to change the position of a zoom lens, whereby the magnification factor of the optical system can be varied (see, for example, patent documents 1 to 3 (Japanese Laid-Open Patent Application Publication No. 2002-23036, No. H9-189844 and No. 2010-26322)).

SUMMARY

However, in a lens barrel provided with such a cam mechanism, the cam follower may be damaged when an external force is applied as a result of dropping, or other adverse events.

Therefore, an object of the technology disclosed herein is to provide a lens barrel that can be strengthened against external forces resulting from dropping or other adverse events.

In order to achieve the abovementioned object, the lens barrel according to the technology disclosed herein is provided with a cylindrical moving frame and a cylindrical cam frame. The cylindrical moving frame has a first cam follower and a second cam follower. The first cam follower projects radially from the inner peripheral surface or the outer peripheral surface of the moving frame. The second cam follower projects radially further from the top of the first cam follower. The cylindrical cam frame is disposed on the inner periphery or the outer periphery of the moving frame, and has a first cam and a second cam on the outer peripheral surface side or the inner peripheral surface side. The first cam engages with the first cam follower, and has a cam surface only on the image plane side in the optical axis direction. The second cam is formed on the bottom surface of the first cam, and engages with the second cam follower.

According to the configuration of the abovementioned technology, there can be provided a lens barrel capable of being strengthened against external force resulting from dropping or other adverse events.

BRIEF DESCRIPTION OF THE DRAWINGS

FIGS. 5A-1 to 5B-2 are diagrams illustrating the relationship between the cam and the cam follower included in the lens barrel in FIG. 1;

FIGS. 7A-1 to 7B-2 are diagrams illustrating the relationship between the cam and the cam follower related to the comparative example;

FIGS. 9A-1 to 9B-2 are diagrams illustrating the relationship between the cam and the cam follower related to embodiment 2;

FIGS. 10A-1 to 10B-2 are diagrams illustrating the relationship between the cam and the cam follower related to embodiment 3; and FIGS. 11A-1 to 11B-2 are diagrams illustrating the relationship between the cam and the cam follower related to embodiment 4.

DETAILED DESCRIPTION OF THE PREFERRED EMBODIMENTS (Embodiment 1)

1. Configuration of the Lens Barrel

Figure 1:
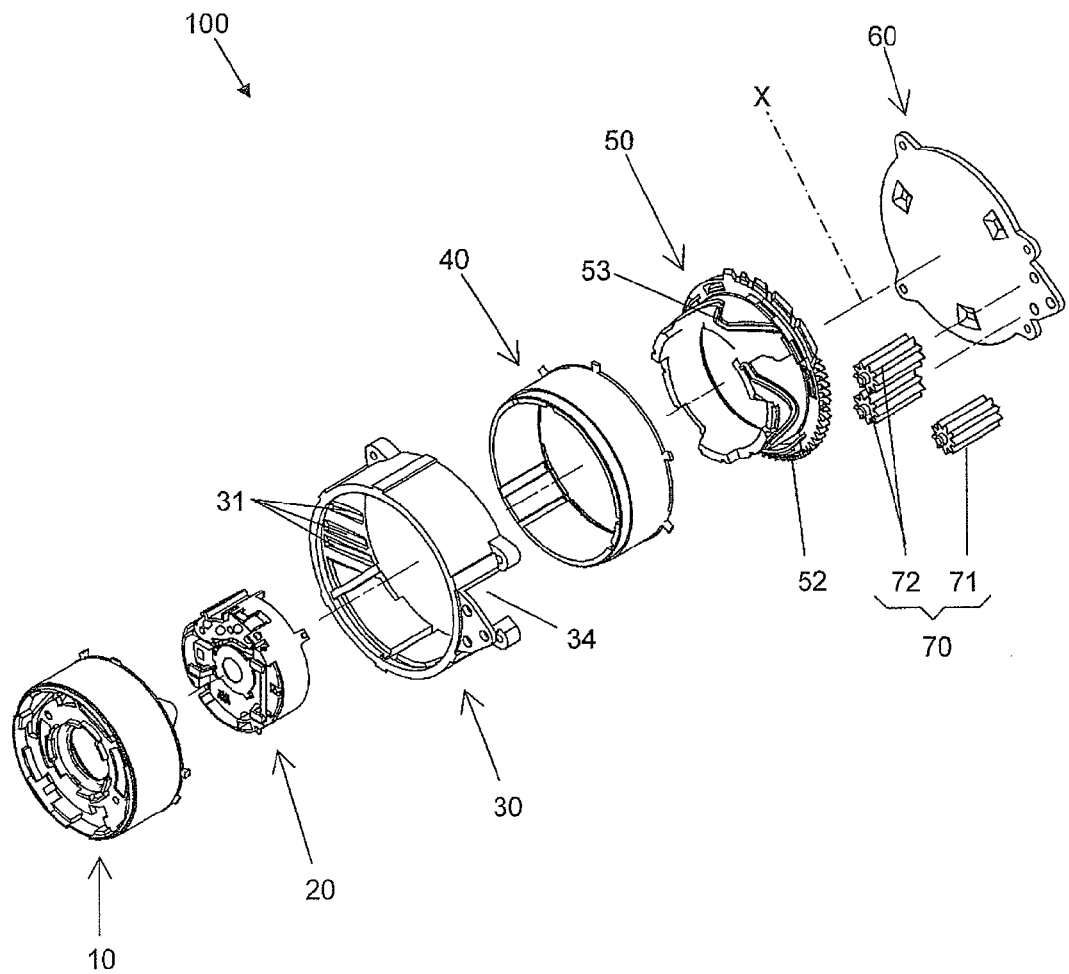
FIG. 1 is an exploded perspective view of the lens barrel related to embodiment 1.

FIG. 1 is a decomposed perspective view of a lens barrel 100 related to the present embodiment.

A lens barrel 100 is mounted on a digital still camera or another device having a camera function. The lens barrel 100 is provided with an optical system having various lenses including a zoom lens and/or a focusing lens inside. The optical system of the lens barrel 100 resolves incident light on image-capturing elements. The image-capturing elements convert the incident light into electrical signals.

The lens barrel 100 according to the present embodiment is one example of the technology disclosed herein, but the invention is not limited to digital still cameras; the lens barrel can also be mounted on a video camera, or the like.

The lens barrel 100 has a first group frame (moving frame) 10, a second group frame 20, a fixed frame 30, a drive mechanism 70, a straight-advance frame 40, a cam frame 50, and a master flange 60 disposed in mutually coaxial positions (the axial direction is hereinafter referred to as the "optical axis").

The fixed frame 30 holds the straight-advance frame 40 and the cam frame 50 in its interior. The straight-advance frame 40 holds the first group frame 10 in a manner allowing straight-ahead movement in its interior. The first group frame 10 engages the internal cam frame 50 using a cam mechanism. The first group frame 10 holds the second group frame 20 in its interior.

In the present embodiment, the optical system of the lens barrel 100 has the above configuration.

The fixed frame 30 is fixed on the master flange 60, which is provided with image-capturing elements.

The first group frame 10 is a cylindrical frame holding a lens disposed on subject-most side. The first group frame 10 advances and retracts in the optical axis direction relative to the straight-advance frame 40. The first group frame 10 has a straight-advance projection that projects in the outer diameter direction. The straight-advance projection engages in a straight-advance groove provided on the inner peripheral surface of the straight-advance frame 40, whereby the first group frame 10 is held inside the straight-advance frame 40 so as not to rotate relatively with respect to the straight-advance frame 40. The first group frame 10 has three cam followers 11 (see FIG. 5B-1, etc.) on the inner peripheral surface. The cam follower 11 engages with a cam 53 provided on the outer peripheral surface of the cam frame 50.

The second group frame 20 has a lens on its interior. The second group frame 20 is held inside of the first group frame 10. Although not described in detail, the second group frame 20 also advances and retracts in the optical axis direction using the same kind of mechanism as the first group frame 10.

The fixed frame 30 holds the straight-advance frame 40 to allow straight advancing on the surface on the inner periphery side. A straight-advance groove is provided on the inner peripheral surface of the fixed frame 30. Having the straight-advance projection provided on the outer peripheral surface of the straight-advance frame 40 engage in the straight-advance groove allows the straight-advance frame 40 to be advanced straight relative to the fixed frame 30.

The fixed frame 30 rotatably holds the cam frame 50. A helical guide projection 31 is provided on the inner peripheral surface of the fixed frame 30. Having the guide projection 31 engage with a guide groove 51 provided on the outer peripheral surface of the cam frame 50 allows the cam frame 50 to rotate relative to the fixed frame 30. An opening 34 in which a part of the outer peripheral surface has been cut out is provided on the fixed frame 30. A drive mechanism 70 is disposed on the outer peripheral surface side of the fixed frame 30. The drive mechanism 70 rotatably drives the cam frame 50.

The drive mechanism 70 has a linking gear 71 linked to a motor, and two drive gears 72. The two drive gears 72 are engaged with the cam frame 50 inside the fixed frame 30 through the opening 34. The two drive gears 72 are also engaged with the externally disposed linking gear 71. The linking gear 71 is rotatably driven by the motor. Because the linking gear 71 engages with each of the two drive gears 72, the three gears rotate in association and thereby rotatably drive the cam frame 50.

The straight-advance frame 40 is held so as to be capable of advancing straight in the optical axis direction inside the fixed frame 30. The straight-advance frame 40 holds the first group frame 10 so as to be capable of advancing straight in the optical axis direction relative to the straight-advance frame 40 and so as not to rotate relatively to the fixed frame 30. The straight-advance frame 40 is bayonet-coupled with the outer periphery of the cam frame 50, and rotatably holds the cam frame 50. The straight-advance frame therefore advances and retracts integrally with the cam frame 50 in the optical axis direction. In other words, the straight-advance frame 40 is held in the fixed frame 30 so as to be capable of rotating relative to the cam frame 50 and not to advance or retract in the optical axis direction relative to the cam frame 50.

Three cams 53 are formed on the outer peripheral surface of the cam frame 50. The cams 53 engage with three cam followers 11 (see FIG. 5B-1, etc.) provided on the inner peripheral surface of the first group frame. A driven gear unit 52 meshing with the two drive gears 72 is provided on the outside of the cam frame 50. The cam frame 50 is rotatably driven by the rotation of the drive gears 72. When the cam frame 50 is rotatably driven, the first group frame 10 holding the cam frame 50 is driven so as to advance straight in the optical axis direction via the cam mechanism.

Furthermore, a guide groove 51 in which a guide projection 31 of the fixed frame 30 side is engaged is provided on the outer peripheral surface of the cam frame 50. The guide projection 31 is provided in a helical form on the inner peripheral surface of the fixed frame 30. Therefore, when the cam frame 50 is rotatably driven by the drive gears 72, the cam frame 50 is guided along the guide projection 31 of the fixed frame 30.

The cam frame 50 thereby advances and retracts in the optical axis direction relative to the fixed frame 30 while rotating. Since the first group frame 10 does not rotate relatively to the straight-advance frame 40, the first group frame 10 will rotate relatively with respect to the cam frame 50. As a result, the first group frame 10 is guided by the cam 53 and advances and retracts in the optical axis direction. The second group frame 20 also advances and retracts in the optical axis direction using the same kind of mechanism as the first group frame 10.

The optical system of the lens barrel 100 is configured as above by assembling the first group frame 10, second group frame 20, fixed frame 30, straight-advance frame 40, cam frame 50, and master flange 60.

The image-capturing elements and the fixed frame 30 are fixed on the master flange 60. Light passing through the optical system of the lens barrel 100 is thereby resolved on the image-capturing elements fixed on the master flange 60.

Here, the guide projection 31 provided on the fixed frame 30 and the cam 53 provided on the cam frame 50 are designed to be in suitable positions relative to the rotational angle of the cam frame 50. The lens fixed in the first group frame 10 is therefore disposed so as to arrive at a prescribed position relative to the rotational angle of the cam frame 50. The lens barrel 100 can thereby be used to change the focal distance of the optical system when images are captured and store the optical system when images are not being captured.

2. Engagement Between the Cam and the Cam Shaft

The engagement between the fixed frame 30 and the cam frame 50 shall now be described in detail.

Figure 2:
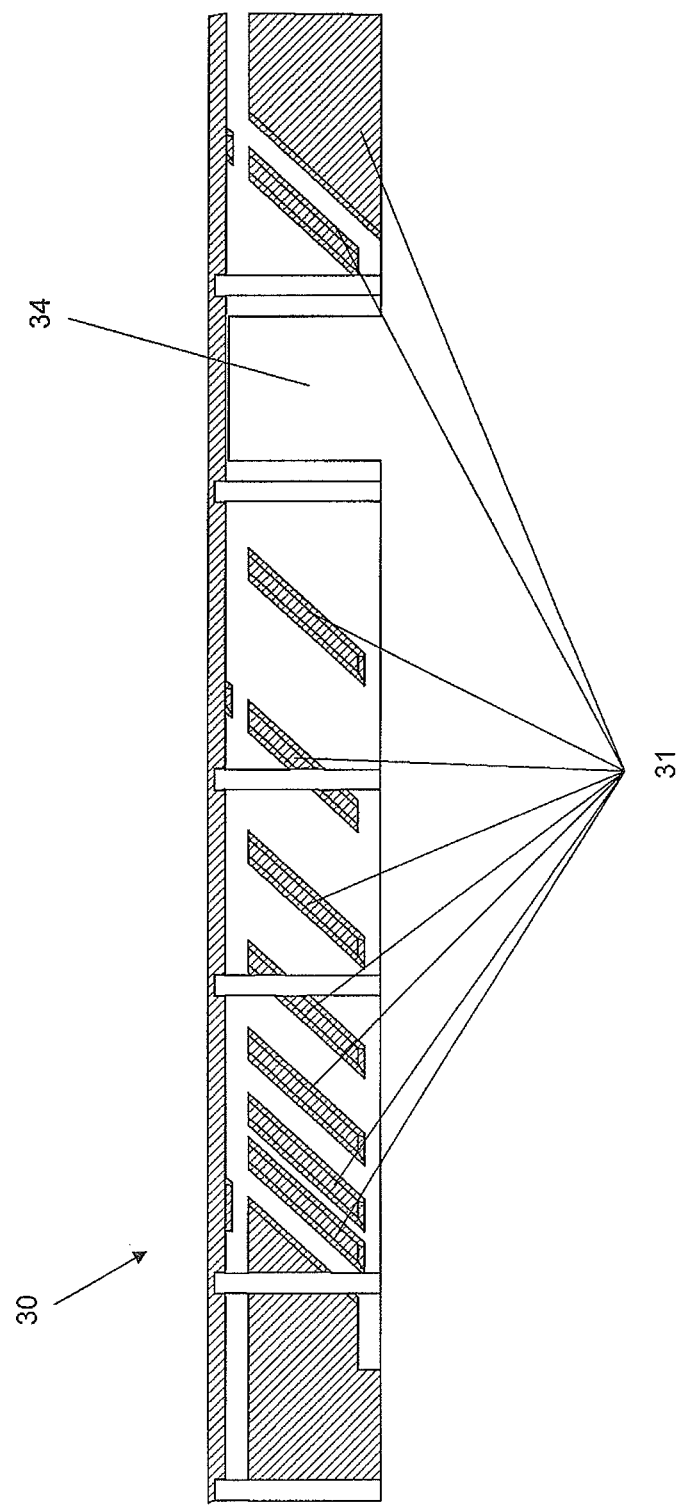
FIG. 2 is a development view of the inner peripheral surface of the fixed frame included in the lens barrel in FIG. 1.

FIG. 2 is a development view of the inner peripheral surface of the fixed frame 30 of the present embodiment. In FIG. 2, the shaded regions project further in the inner diameter direction than the other regions.

A plurality of guide projections 31 is provided on the inner peripheral surface of the fixed frame 30 as illustrated in FIG. 2.

The plurality of guide projections 31 project in the inner diameter direction. A plurality of helical guide projections 31 is thus formed on the inner peripheral surface of the fixed frame 30. The fixed frame 30 has an opening 34 running through radially. The drive gears 72 and the linking gear 71 are disposed outside of the opening 34 of the fixed frame 30 as illustrated in FIG. 1.

Figure 3:
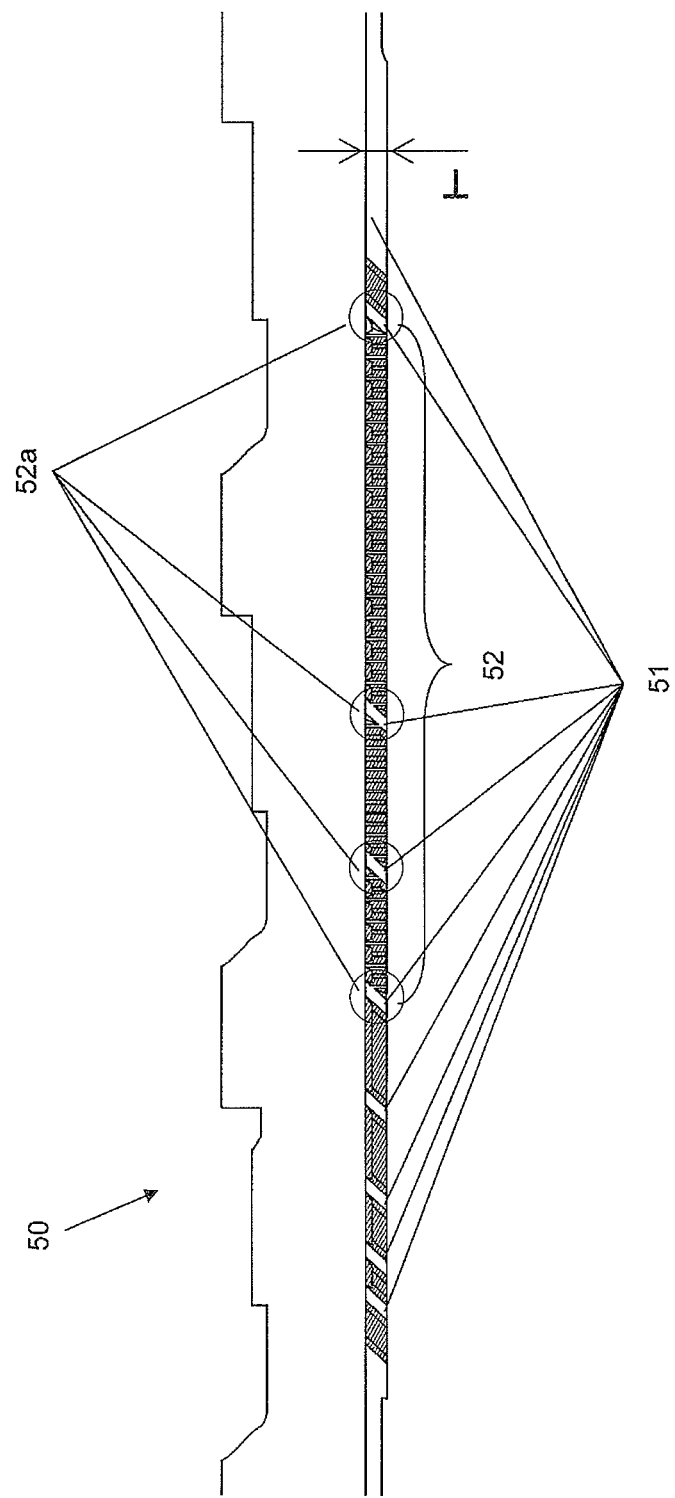
FIG. 3 is a development view of the outer peripheral surface of the cam frame included in the lens barrel in FIG. 1.

FIG. 3 is a development view of the outer peripheral surface of the cam frame 50 of the present embodiment. In FIG. 3, the shaded regions project further in the outer diameter direction than the other regions.

The driven gear unit 52 is provided on the outer peripheral surface of the cam frame 50 as illustrated in FIG. 3. The driven gear unit 52 projects in the outer diameter direction and engages with the drive gears 72. A plurality of guide grooves 51 is provided in a helical form on the outer periphery part of the cam frame 50. The plurality of guide grooves 51 are engaged by a plurality of guide projections 31 on the side of the fixed frame 30.

At least one of the plurality of guide grooves 51 is disposed so as to overlap the driven gear unit 52. Therefore, the area where the guide groove 51 is provided on the driven gear unit 52 is a toothless part 52a.

When the cam frame 50 is rotated relative to the fixed frame 30 with the cam frame 50 inserted on the inner periphery side of the fixed frame 30, the guide projections 31 of the fixed frame 30 and the guide grooves 51 of the cam frame 50 engage and the cam frame 50 is guided in the optical axis direction.

In the present embodiment, the cam frame 50 is rotatably driven by the meshing between the drive gear 72 and the driven gear unit 52. However, when the drive gear 72 overlaps the toothless part 52a, ordinarily the drive gear 72 and the driven gear unit 52 do not mesh and the drive gear 72 rotates idly.

This is circumvented by a method in which the optical-direction length T (see FIG. 3) of the driven gear unit 52 is increased. In other words, when the length T in the optical axis direction of the driven gear unit 52 is increased, even if the toothless part 52a overlaps the driven gear unit 52, the drive gear 72 engages with the driven gear unit 52 in a particular location within the region in the optical axis direction because the guide groove 51 is inclined relative to the optical axis direction.

However, when the length T in the optical axis direction of the driven gear unit 52 is increased, the advancing and retracting stroke of the cam frame 50 inside the fixed frame 30 is reduced.

Therefore, in the present embodiment, a plurality (two in the present embodiment) of drive gears 72 is provided and are configured so that at least one of the plurality of drive gears 72 always meshes with the driven gear unit 52 in a usage state.

Figure 4:
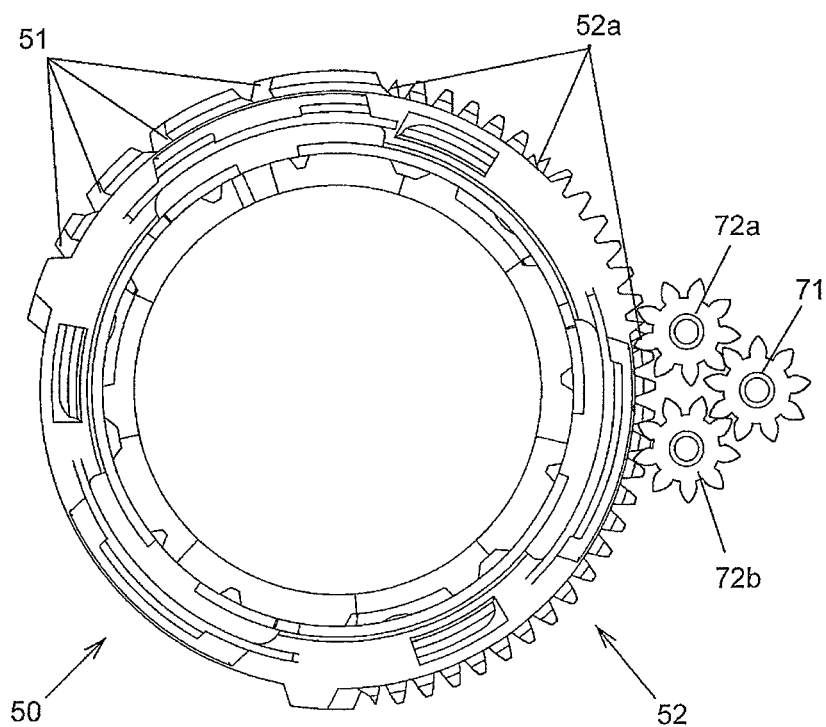
FIG. 4 is a diagram illustrating the coupling relationship between the cam frame and the drive gear included in the lens barrel in FIG. 1.

FIG. 4 is a diagram illustrating the engagement between the cam frame 50 and the drive gears 72 of the present embodiment.

The drive gears 72 of the present embodiment include a first drive gear 72a and a second drive gear 72b as illustrated in FIG. 4. Each of the first drive gear 72a and the second drive gear 72b meshes with the driven gear unit 52. The first drive gear 72a and the second drive gear 72b also each mesh with the linking gear 71.

Driving is thereby possible without problem even when the optical-axis-direction length T of the driven gear unit 52 is reduced. As a result, when compared with a conventional lens barrel having an equal optical-axis-direction length, the advancing and retracting stroke of the cam frame can be made larger than conventionally achieved.

According to the above configuration, idle rotation of the cam frame 50 can be circumvented even when the driven gear unit 52 and the guide groove 51 provided on the cam frame 50 are overlapped because, for example, the second drive gear 72b meshes even when the first drive gear 72a rotates idly in the area where the toothless part 52a formed on a part of the driven gear unit 52 overlaps with the guide groove 51. It is thereby possible to provide a lens barrel 100 of a smaller optical-axis-direction length than conventionally used while circumventing idle rotation of the cam frame 50 in a configuration in which the driven gear unit 52 and the guide groove 51 provided on the cam frame 50 are overlapped.

The optical-axis direction length of the lens barrel 100 when the barrel is stored can be reduced if the optical-axis direction length of the fixed frame 30 is reduced within a range in which the necessary stroke can be ensured.

In the present embodiment, a configuration providing two drive gears 72 was illustrated, but a configuration including three or more drive gears also is possible.

In the present embodiment, a configuration is illustrated in which a single linking gear 71 engages with the first and second drive gears 72a and 72b and the first and second drive gears 72a and 72b are caused to rotate by the rotation of the linking gear 71; however, such an arrangement is not provided by way of limitation to the present invention.

For example, it is also possible to have a configuration in which one linking gear is provided for each of a plurality of drive gears and each of the drive gears is respectively rotatably driven by each of the linking gears.

However, considering that the number of parts in the lens barrel 100 can be reduced by having a plurality of first and second drive gears 72a and 72b rotatably driven by a single linking gear 71 as in the present embodiment, the plurality of drive gears should be rotatably driven using as few linking gears as possible.

In the present embodiment, another configuration has the drive gears 72 arranged in tandem, but the optical-axis direction lengths, the outer diameters, or the number of teeth may be varied between the first drive gear 72a and the second drive gear 72b, and these may be suitably selected in accordance with the design.

For example, when drive gears having different heights in the direction of the rotational axis are used, other parts can be disposed closer for the area of the drive gear that is shorter than the other drive gear. The space in the direction of the rotational axis inside a lens barrel having a large number of parts can thereby be ensured.

3. Engagement Between First Group Frame and Cam Frame

The engagement between the first group frame 10 and the cam frame 50 of the present embodiment shall now be described in detail.

Figures 1, 2, 5A:
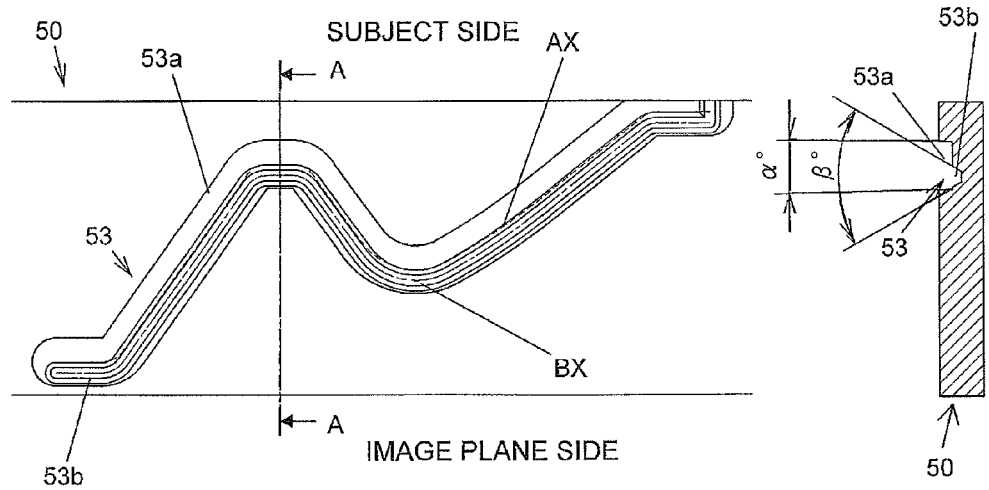
Figures 1, 2, 5B:
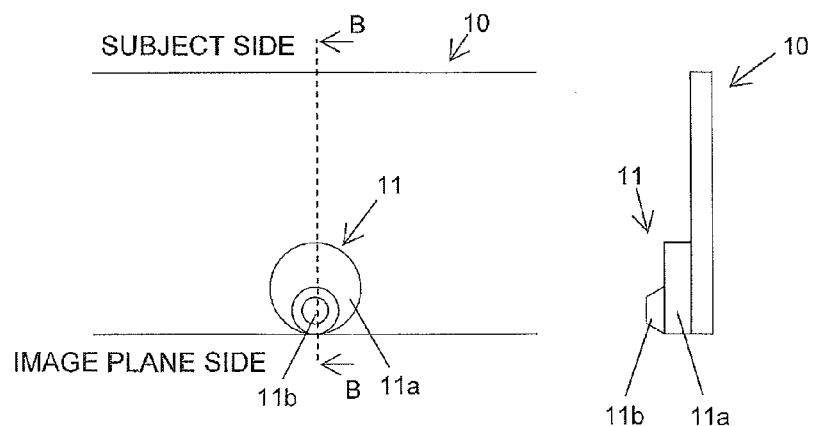

FIGS. 5A-1 to 5B-2 are diagrams illustrating the cam 53 and the cam follower 11 of the present embodiment. Specifically, FIG. 5A-1 is a development view of the outer peripheral surface of the cam frame 50, and FIG. 5A-2 is a cross-sectional view along A-A in 5A-1 (likewise hereinafter with respect to FIGS. 7, 9, 10, and 11). FIG. 5B-1 is a development view of the inner peripheral surface of the first group frame 10, and FIG. 5B-2 is a cross-sectional view along B-B in 5B-1 (hereinafter the same also with respect to FIGS. 7, 9, 10, and 11).

Figures 6A, 6B:
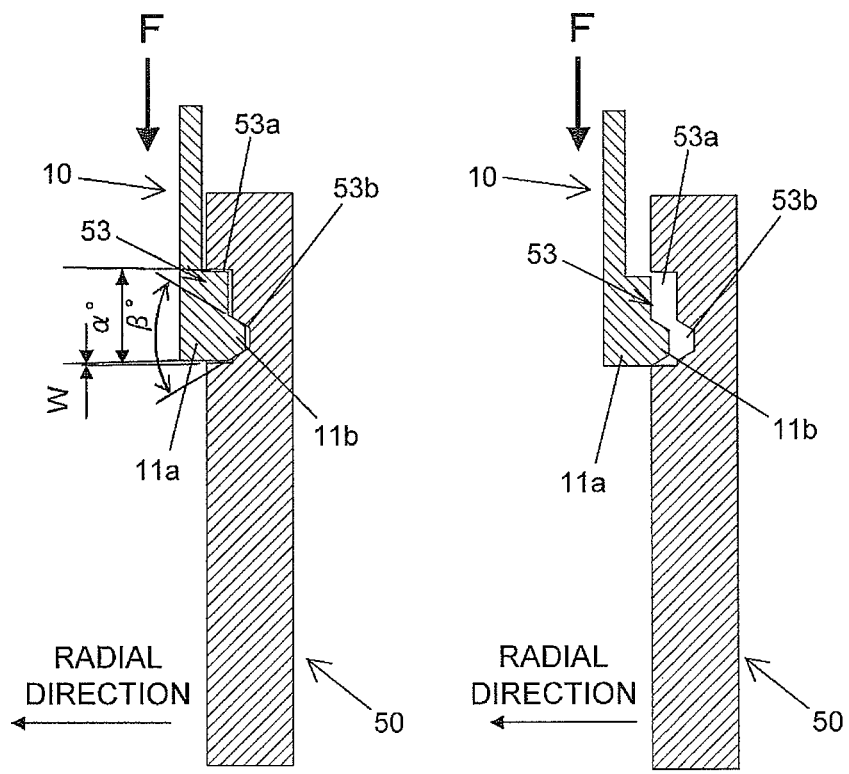
FIGS. 6A and 6B are diagrams illustrating the coupling relationship between the cam and the cam follower included in the lens barrel in FIG. 1.

FIGS. 6A and 6B are diagrams illustrating the engagement between the cam 53 and the cam follower 11 of the present embodiment. FIG. 6A is a cross-sectional view illustrating the state of engagement between the cam 53 and the cam follower 11 in normal circumstances, and FIG. 6B is a cross-sectional view illustrating the state of engagement between the cam 53 and the cam follower 11 when an external force F is applied (likewise hereinafter with respect to FIG. 8).

The cam frame 50 of the present embodiment has a cam 53 engaged with a cam follower 11 as illustrated in FIGS. 5A-1 and 5A-2.

The cam 53 has a first cam 53a having a shallow and wide groove, and a second cam 53b having a narrower groove than the first cam 53a.

The second cam 53b is disposed in a position overlapping the first cam 53a, and is formed deeper relative to the bottom surface (the surface following the vertical direction in FIG. 5A-2) of the first cam 53a. The center line BX of the second cam 53b is provided further toward the image plane side than the center line AX of the first cam 53a.

In other words, the center of curvature of the second cam 53b is provided further toward the image plane side than the center of curvature of the first cam 53a. An angle α formed by two mutually opposite side surfaces forming the first cam 53a in cross section in the optical axis direction is smaller than an angle β formed by two mutually opposite side surfaces forming the second cam 53b in cross section in the optical axis direction.

The cam follower 11 of the first group frame 10 of the present embodiment has a first cam follower 11a projecting radially from the inner diameter of the first group frame 10, and a second cam follower 11b projecting radially of the first group frame further from the upper surface (the surface following the vertical direction in FIG. 5B-2) of the first cam follower 11a, as illustrated in FIGS. 5B-1 and 5B-2.

The first cam follower 11a has a round-columnar shape as illustrated in FIGS. 5B-1 and 5B-2. The second cam follower 11b has a truncated-cone shape as illustrated in FIGS. 5B-1 and 5B-2.

The diameter of the truncated-cone-shaped second cam follower 11b is smaller than the diameter of the round-columnar-shaped first cam follower 11a. That is, the first cam follower 11a has a larger cross-sectional area than the second cam follower 11b as illustrated in FIG. 5B-2.

The first cam follower 11a and the second cam follower 11b are formed to substantially the same height. The first cam follower 11a and the second cam follower 11b are disposed so that the end surfaces on the image plane side in the optical axis direction are substantially coplanar.

The second cam 53b is formed inside a region in the optical axis direction of the inner peripheral surface of the cam frame 50 as illustrated in FIGS. 5A-1 and 5A-2. In other words, the second cam 53b has mutually opposite side surfaces in almost the entire region on the inner peripheral surface of the cam frame 50.

The area formed on the end part on the subject-most side of the first cam 53a extends from the region in the optical axis direction of the inner peripheral surface of the cam frame 50. In other words, the distance from the end part on the image plane side to the end part on the subject side of the second cam 53b can be reliably longer than that of the first cam 53a. The stroke can be larger for the second cam 53b than the first cam 53a when the optical-axis direction length of the cam frame 50 is the same.

The necessary stroke is therefore ensured in the present embodiment by the second cam 53b and the round-columnar second cam follower 11b having a smaller diameter.

The optical-axis direction length of the cam frame 50 can be shortened in the present embodiment when the stroke of the cam 53 is designed to be the same. The optical-axis direction length with the lens barrel 100 stored can therefore be made shorter than the conventional.

However, the necessarily corresponding diameter of the cam follower 11 also becomes smaller when the width of the cam 53 is narrowed, and the cam follower 11 easily breaks when an external force is applied.

Therefore, in the present embodiment, the cam follower 11 is configured with the first cam follower 11a having a larger diameter and the second cam follower 11b having a smaller diameter being overlaid in two stages.

Any external force can thereby be countered by the first cam follower 11a, which has a larger diameter than the second cam follower 11b, and breakage of the cam follower 11 can therefore be prevented.

Furthermore, in the lens barrel 100 of the present embodiment, the first cam follower 11a can be prevented from shifting radially and falling from the first cam 53a even when a large external force F is applied, as illustrated in FIGS. 6A and 6B.

When a large external force F is applied, the first group frame 11 shifts radially and almost falls from the cam frame 50 as illustrated in FIG. 6B. However, the lens barrel 100 of the present embodiment is configured so that the second cam follower 11b hangs on the first cam 53a and the cam follower 11 therefore does not fall from the cam 53b even when a large external force F is applied.

As stated above, the lens barrel 100 of the present embodiment can be capable of withstanding greater external forces than conventionally realized without increasing the optical-axis direction length.

As illustrated in FIGS. 6A and 6B, an angle α formed by two mutually opposite side surfaces of the first cam follower 11a in cross section in the optical axis direction is smaller than an angle β formed by two mutually opposite side surfaces of the second cam follower 11b in cross section in the optical axis direction. In other words, the side surface of the second cam follower 11b is inclined more so than the side surface of the first cam follower 11a.

A slight gap W is provided as illustrated in FIG. 6A between the first cam 53a and the first cam follower 11a. Under normal use, the first cam 53a and the first cam follower 11a do not slide, but the second cam 53b and the second cam follower 11b slide.

When an external force F is applied to the first group frame 10, the second cam follower 11b slips on the inclined side surface of the second cam 53b and the first cam follower 11a contacts the first cam 53a.

Retracting of the cam follower 11 from the cam 53 and damage to the cam follower 11 can be prevented.

During normal use, the first cam follower 11a does not slide with the first cam 53a because of the gap W. The first cam 53a and the first cam follower 11a can therefore be prevented from catching when the cam follower 11 moves in the optical axis direction. The side surface on the subject side of the first cam 53a also disappears when the cam follower 11 moves to the side most toward the object. Rattling between the cam 53 and the cam follower 11 can therefore be prevented.

The gap W desirably has a minimum size; e.g., about 0.01 to 0.05 mm, so that the first cam follower 11a does not contact the first cam 53a under normal circumstances. By thus minimizing the gap W, the weight on the second cam follower 11b, being a smaller part than the first cam follower 11a, is reduced and fracturing or deformation of the second cam follower 11b can be prevented even when an external force F is applied.

The effects of the technology disclosed herein are described below using FIGS. 7A-1 to 7B-2 and FIGS. 8A and 8B.

Figures 1, 2, 7A:
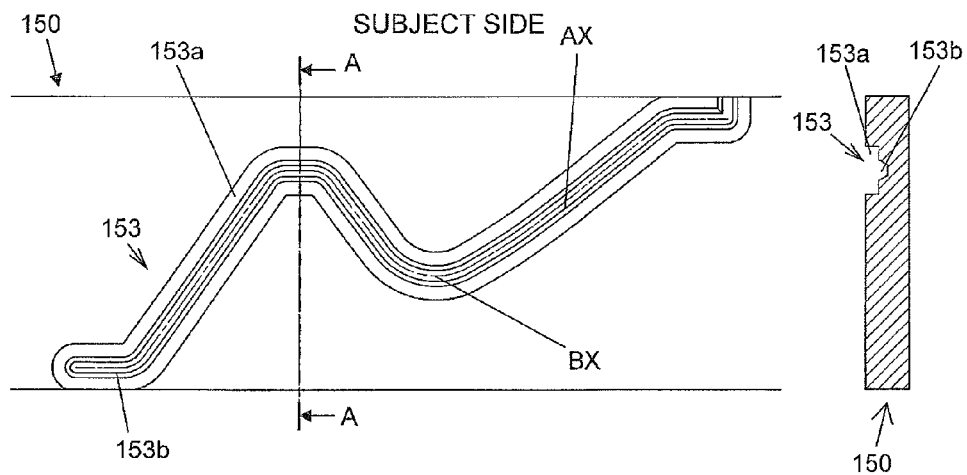

FIGS. 7A-1 to 7B-2 are diagrams illustrating the cam 153 and the cam follower 111 as a comparative example. FIG. 7A-1 is a development view of the outer peripheral surface of the cam frame 150, and FIG. 7A-2 is a cross-sectional view along A-A in FIG. 7A-1.

Figures 1, 2, 7B:
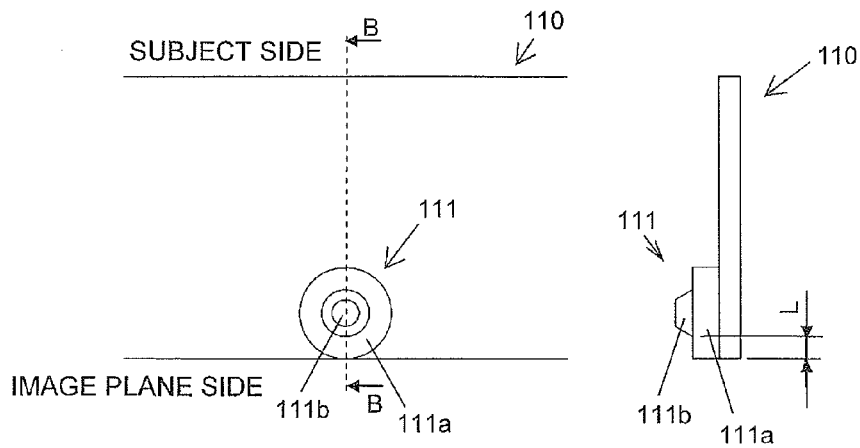

FIG. 7B-1 is a development view of the inner peripheral surface of the first group frame 110, and FIG. 7B-2 is a cross-sectional view along B-B in FIG. 7B-1.

Figures 8A, 8B:
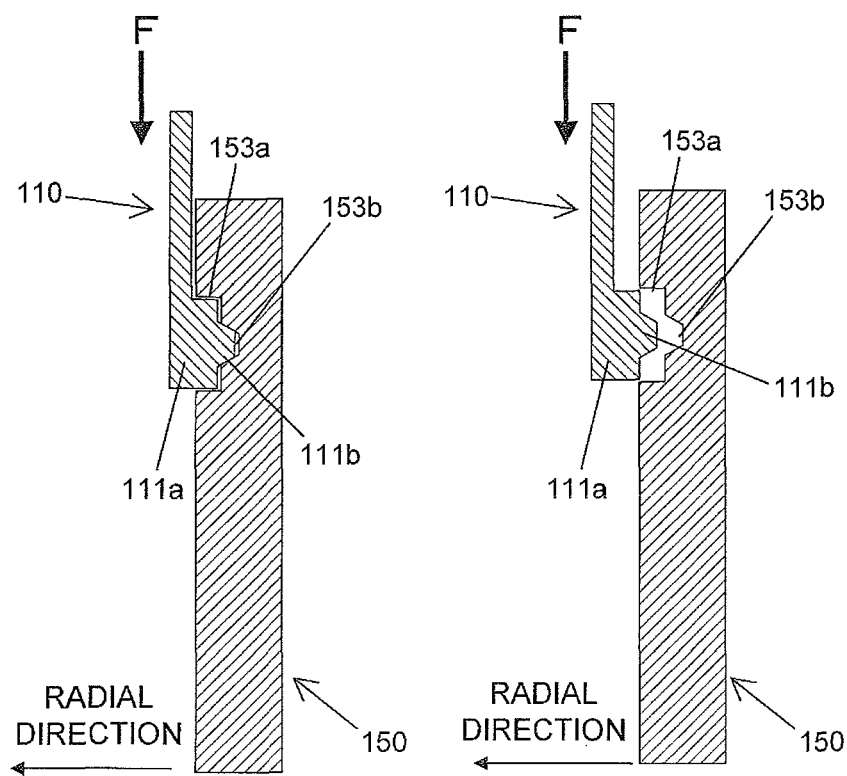
FIGS. 8A and 8B are diagrams illustrating the coupling relationship between the cam and the cam follower related to the comparative example.
Figures 1, 2, 9A:
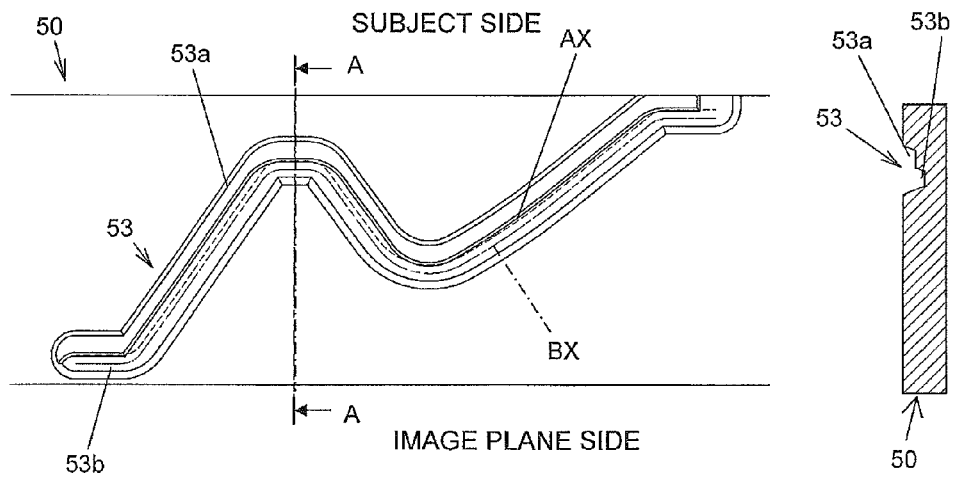
Figures 1, 2, 9B:
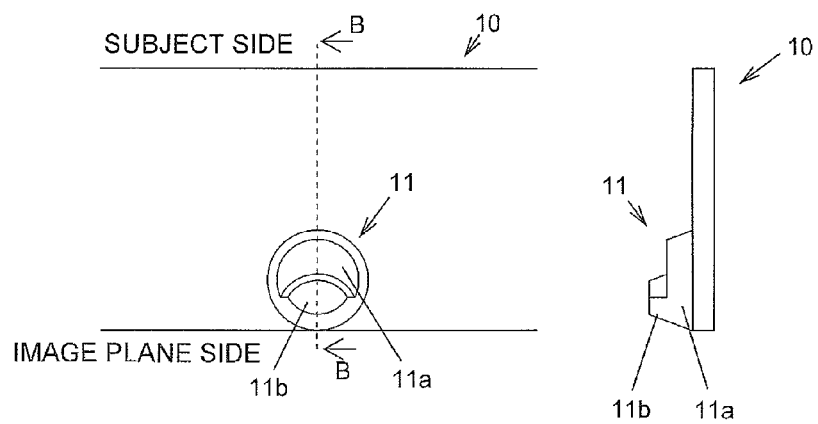

FIGS. 8A and 8B are diagrams illustrating the coupling relationship between the cam 153 and the cam follower 111 as a comparative example. FIG. 8A is a cross-sectional view illustrating the state of engagement between the cam 153 and the cam follower 111 when normal, and FIG. 8B is a cross-sectional view illustrating the state of engagement between the cam 153 and the cam follower 111 when an external force F is applied.

In FIGS. 7A-1 and 7A-2, the shape of the cam 153 of the comparative example is the same as the first cam 53a and the second cam 53b according to the present embodiment, but the positional relationship is different.

In other words, in the present embodiment, the center line BX of the second cam 53b is provided further toward the image plane side than the center line AX of the first cam 53a, but in the comparative example, the center lines of the first cam 153a and the second cam 153b are disposed in the same position.

In FIGS. 7B-1 and 7B-2, the shapes of the first cam follower 111a and the second cam follower 111b of the cam follower 111 of the first group frame 110 of the comparative example are the same, but the positional relationship is different. In other words, the center of the first cam follower 111a and the center of the second cam follower 111b are formed coaxially. Therefore, the outline on the image-plane-most side between the first cam follower 111a and the second cam follower 111b has a step in the amount of L.

As is clear by comparing FIGS. 5A-1 to 5Bb-2 and FIGS. 7A-1 to 7B-2, the first group frame 110 of the comparative example is longer in the optical axis direction by L compared with the first group frame 10 of the present embodiment. Therefore, the length of the first group frame 110 must be compensated for by another portion when the first group frame 110 is long, and the dimension in the optical axis direction in the stored state of the lens barrel also becomes longer. Therefore, in the present embodiment, the optical-axis direction length of the first group frame 10 can be made shorter than the optical-axis direction length of the first group frame 110 according to the comparative example.

A large external force F is often applied to the lens barrel 100 in a direction in which the first group frame 10 positioned on the subject-most side is pushed in toward the image plane side, for example, when a camera having mounted the first group frame 10 lens barrel 100 is dropped or otherwise adversely affected.

The case in which a large external force F is applied to the first group frame 110 in the configuration of the comparative example shall now be examined using FIGS. 8A and 8B.

The first cam follower 111a shifts radially from the first cam 153a on receiving an external force F, and almost falls from the first cam 153a. The cam follower 111 falls from the cam 153 when the large external force F is applied in this state.

With the lens barrel 100 of the present embodiment, the configuration is such that the cam follower 11 does not readily fall from the cam 53 as described above, compared with the comparative example, even when the same large external force F as in the comparative example is applied.

This is because the second cam follower 11b catches on the first cam 53a even when the first cam follower 11a shifts radially from the first cam 53a and almost falls.

The second cam follower 11b is desirably positioned on the image-plane-most side of the first cam follower 11 in order to realize to the greatest extent the extent of the cam follower 11 not easily falling in response to a large external force F. In other words, the second cam follower 11b and the first cam follower 11a are desirably provided to substantially the same height in the optical axis direction on the image-plane-most side.

According to the above configuration, the lens barrel 100 of the present embodiment can be made more resistant to external forces while being reduced in optical-axis direction length.

(Other Embodiments)

Other embodiments related to the technology disclosed herein are described.

1. Configuration of Lens Barrels of Other Embodiments

Lens barrels 100 according to other embodiments have the same configuration as the lens barrel 100 of the present embodiment except for the configuration of the cam follower 11 and the cam 53. Therefore, a detailed description is omitted below. The configuration of the lens barrel 100 according to the present embodiment is only one example, and other configurations therefore may be adopted.

2. Embodiment 2

FIGS. 9A-1 to 9B-2 are diagrams illustrating the cam 53 and the cam follower 11 of the present embodiment.

In the present embodiment as illustrated in FIGS. 9A-1 to 9B-2, the first cam follower 11a has a truncated-cone shape in cross-sectional view.

The second cam follower 11b has a shape in which the arcuate portion of a part of a round-columnar shape is bent back and overlaid in the optical axis direction. The inclined surface on the image plane side of the second cam follower 11b becomes a surface continuing with the inclined surface of the first cam follower 11a.

The fact that the center line BX of the second cam 53b is provided further toward the image plane side than the center line AX of the first cam 53a is the same as with the embodiment described above.

While the shape of the cam follower 11 of the present embodiment is somewhat different from the shape of the cam follower 11 of the abovementioned embodiment 1, the same operation and effects are provided.

The shapes of two kinds of cam followers 11 are described in embodiments 1 and 2. However, other shapes (not shown) can be adopted in the present technology, and suitable shapes may be selected in accordance with the design.

According to the above configuration, the lens barrel 100 of the present embodiment can be made more resistant to external forces while having a shorter optical-axis direction length than the prior art.

3. Embodiment 3

FIGS. 10A-1 to 10B-2 are diagrams illustrating the cam 53 and the cam follower 11 of the present embodiment.

As illustrated in FIGS. 10A-1 to 10A-2, the shape of the second cam 53b of the cam frame of the present embodiment is the same as that of the second cam 53b of the abovementioned embodiment 1.

However, the cam 53 of the present embodiment differs from that of the abovementioned embodiment 1 in that a first cam 53a for contacting the cam follower 11 when the first group frame 10 is subjected to an external force F (see FIG. 6A, and the like) and a thin part 54 provided at least on the subject side of the first cam 53a are provided.

The thin part 54 does not have a side surface (cam surface) on the subject side in the area of the first cam 53a, but has a side surface (cam surface) only on the image plane side. The shape of the side surface on the image plane side of the first cam 53a is the same as that in the abovementioned embodiment 1.

According to the above configuration, the thin part 54 is provided on the side further toward the object than the first cam 53a in the cam frame 50, and a thick part 55 having a greater cross-sectional thickness than the thin part 54 is provided on the side further toward the image plane than the first cam 53a in the cam frame 50.

In other words, the cam frame 50 of the present embodiment has a thin part 54 that is less thick than the other regions, and a second cam 53b provided on the image plane side of the thin part 54 with the cam frame 50 being thinner than the thin part 54.

The shape of the second cam follower 11b of the cam follower 11 of the present embodiment is substantially the same as the shape of the second cam follower 11b of the abovementioned embodiment 1, as illustrated in FIGS. 10B-1 to 10B-2.

However, in the present embodiment, the cam follower 11 has a first cam follower 11a for contacting with the first cam 53a, and a reinforcing part 12 provided on the side further toward the subject than the region facing opposite the second cam 53b and made thicker than the other portions.

The second cam follower 11b is formed so as to project radially further from the first cam follower 11a, and engages with the second cam 53b.

According to this configuration, in the present embodiment, the strength of the first group frame 10 can be improved because the reinforcing part 12, which is thicker than the other portions relative to the configuration of the abovementioned embodiment 1, is included. Since the first group frame 10 does not readily deform when the strength of the first group frame 10 is improved, the cam follower 11 of the present embodiment can be made less likely to fall from the cam 53 than the cam follower 11 of the abovementioned embodiment 1, even when the same external force F (see FIG. 6A, etc.) is applied to the first group frame 10.

According to the above configuration, the lens barrel 100 of the present embodiment can be made more resistant to external forces while being shorter in optical-axis direction length.

4. Embodiment 4

FIGS. 11A-1 to 11B-2 are diagrams illustrating the cam 53 and the cam follower 11 of the present embodiment.

Figures 1, 2, 11A:
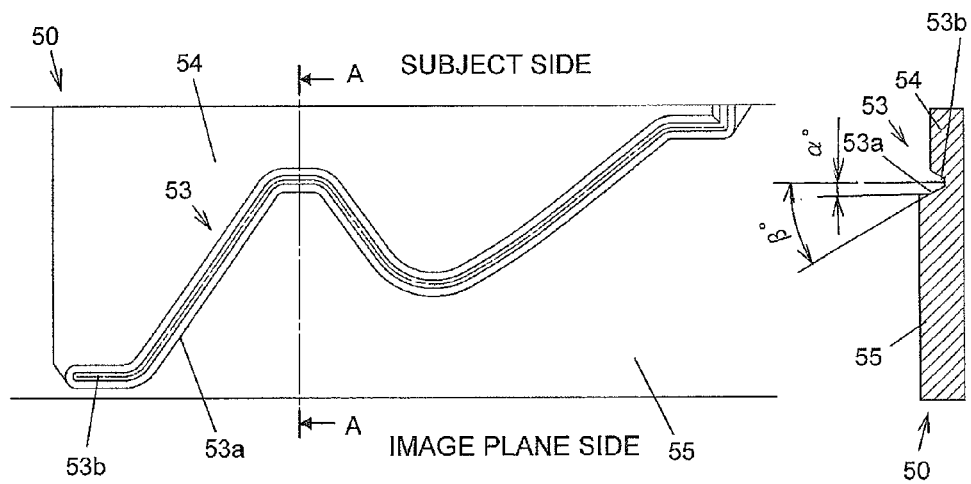
Figures 1, 2, 11B:
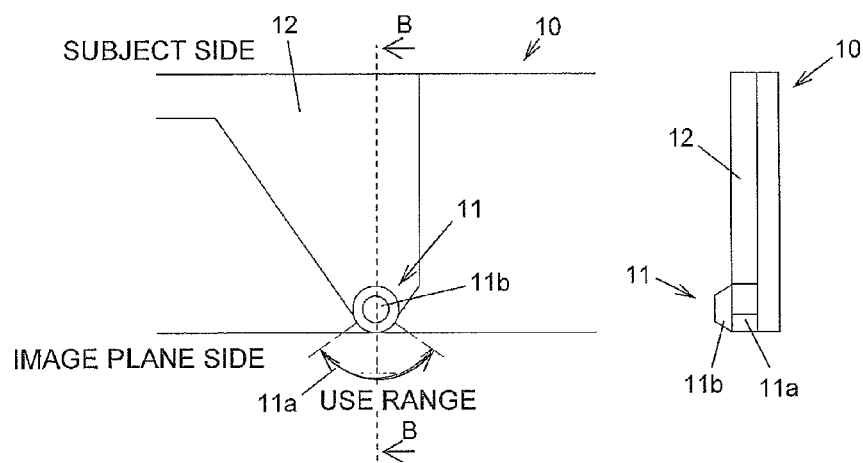

In the cam 53 of the present embodiment as illustrated in FIGS. 11A-1 to 11A-2, the shape of the second cam 53b is substantially the same as in embodiment 1 and embodiment 3.

The cam 53 of the present embodiment is the same as that of embodiment 3 in that a first cam 53a for contacting the cam follower 11 when the first group frame 10 is subjected to an external force F (see FIG. 6A, and the like), and a thin part 54 provided at least on the subject side of the first cam 53a are provided.

However, the cam follower 11 of the present embodiment differs from the cam follower 11 of embodiment 3 in that the outer diameters of the first cam follower 11a and the second cam follower 11b are the same.

Also in the cam follower 11 of the present embodiment, the reinforcing part 12 on the periphery edge of the second cam follower 11b is smaller than the cam follower 11 of embodiment 3.

In the first group frame 10 of the present embodiment, resistance to external forces can be made effectively greater than the first group frame 10 of embodiment 1 because the reinforcing part 12 is provided.

The cam frame 50 of the present embodiment is readily processed because the shape can be formed without a step between the cam surface of the first cam 53a and the cam surface of the second cam 53b.

According to the above configuration, the lens barrel 100 of the present embodiment can be made more resistant to external forces while being shorter in optical-axis direction length.

SUMMARY

1. First Configuration

The lens barrel 100 is provided with a cylindrical first group frame 10 (one example of a moving frame) and a cylindrical cam frame 50 disposed on the inner periphery of the first group frame 10.

The first group frame 10 has a first cam follower 11a projecting radially from the inner peripheral surface thereof, and a second cam follower 11b projecting radially further from the upper surface of the first cam follower 11a.

The cam frame 50 has on the outer peripheral surface thereof a first cam 53a to engage with the first cam follower 11a, and a second cam 53b to engage with the second cam follower 11b. The center of curvature of the second cam 53b is provided on the side further toward the image plane than the center of curvature of the first cam 53a.

The cam frame 50 may be disposed on the outer periphery of the first group frame 10.

In that case, the first cam follower 11a and the second cam follower 11b are provided on the outer peripheral surface of the first group frame 10. The first cam 53a and the second cam 53b also are provided on the inner peripheral surface of the cam frame 50.

According to this configuration, because the center of curvature of the second cam 53b is on the side further toward the image plane than the center of curvature of the first cam 53a in the lens barrel 100 according to the first configuration, the length of the second cam 53b from the image plane side to the subject side can definitely be longer than the first cam 53a. The necessary stroke is thereby ensured by advancing and retracting the first group frame 10 relative to the cam frame 50 in a state in which the second cam follower 11b is engaged with the second cam 53b.

A lens barrel 100 having excellent dropping strength can be provided because the cam follower 11 is formed with a two-stage configuration in which the second cam follower 11b projects from the top of the first cam follower 11a.

It is accordingly possible to provide a lens barrel 100 having greater resistance to external forces while being shorter in optical-axis direction length.

2. Second Configuration

The lens barrel 100 is provided with a cylindrical first group frame 10 (one example of a moving frame) and a cylindrical cam frame 50 disposed on the inner periphery of the first group frame 10.

The first group frame 10 has a first cam follower 11a projecting radially from the inner peripheral surface thereof, and a second cam follower 11b projecting radially further from the upper surface of the first cam follower 11a.

The cam frame 50 has on the outer peripheral surface thereof a first cam 53a to engage with the first cam follower 11a, and a second cam 53b to engage with the second cam follower 11b. The first cam 53a has a cam surface only on the image plane side in the optical axis direction.

The cam frame 50 may be disposed on the outer periphery of the first group frame 10. In that case, the first cam follower 11a and the second cam follower 11b are provided on the outer peripheral surface of the first group frame 10. The first cam 53a and the second cam 53b also are provided on the inner peripheral surface of the cam frame 50.

According to the above configuration, in the lens barrel 100 of the second configuration, the portion on the side further toward the image plane than the first cam 53a on the cam frame 50 can be made thicker because the first cam 53a has a cam surface only on the image plane side. A lens barrel 100 having excellent dropping strength can thereby be provided.

A lens barrel 100 having excellent dropping strength can also be provided because the cam follower 11 is formed with a two-stage configuration in which the second cam follower 11b projects from the top of the first cam follower 11a having a larger cross-sectional area.

As a result, the resistance to external forces can be improved while optical-axis direction length can be reduced.

3. Third Configuration

In the lens barrel 100 according to the first or second configuration, the end parts on the image-plane-most side of the second cam follower 11b and the first cam follower 11a are provided at substantially the same height.

In the lens barrel 100 according to the third configuration, the resistance to external forces can be improved while optical-axis direction length can be reduced because the first and second cam followers 11a and 11b can be configured with a two-stage structure and the end surfaces on the image plane side of the first cam follower 11a having a larger cross-sectional area and the second cam follower 11b having a smaller cross-sectional area are disposed at substantially the same height.

The technology disclosed herein can be applied to devices having a camera function; e.g., cameras, portable telephones with attached cameras, and portable terminals with attached cameras.

General Interpretation of Terms

In understanding the scope of the present invention, the term "configured" as used herein to describe a component, section, or part of a device includes hardware and/or software that is constructed and/or programmed to carry out the desired function.

In understanding the scope of the present invention, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

The invention claimed is:

1. A lens barrel, comprising:
a cylindrical moving frame having a first cam follower that projects radially from an inner peripheral surface or an outer peripheral surface thereof and a second cam follower that projects radially further from the top of the first cam follower; and
a cylindrical cam frame disposed on an inner periphery or an outer periphery of the moving frame, and having on an outer peripheral surface side or an inner peripheral surface side thereof a first cam that engages with the first cam follower and has a cam surface only on an image plane side in an optical axis direction and a second cam that engages with the second cam follower, the second cam being formed on the bottom surface of the first cam.

2. The lens barrel according to claim 1, wherein the first cam follower has a larger cross-sectional area than that of the second cam follower.

3. The lens barrel according to claim 2, wherein end parts on the image-plane-most side in the optical axis direction of the first cam follower and the second cam follower are provided at substantially the same height.

4. The lens barrel according to claim 2, wherein an angle $\alpha$, which is formed by two mutually opposite cam surfaces constituting the first cam, is smaller than an angle $\beta$, which is formed by two mutually opposite cam surfaces constituting the second cam.

5. The lens barrel according to claim 2, wherein the cam frame has a thick-walled part provided on the image plane side of the first cam and forming a cam surface of the first cam and a thin-walled part provided on a subject side of the first cam and having a smaller thickness than that of the thick-walled part.

6. The lens barrel according to claim 2, wherein the moving frame has a reinforcing part that is provided further toward a subject side than a region opposing the second cam on the cam frame side and has a larger thickness than that of other portion thereof.

7. The lens barrel according to claim 1, wherein end parts on the image-plane-most side in the optical axis direction of the first cam follower and the second cam follower are provided at substantially the same height.

8. The lens barrel according to claim 7, wherein an angle $\alpha$, which is formed by two mutually opposite cam surfaces constituting the first cam, is smaller than an angle $\beta$, which is formed by two mutually opposite cam surfaces constituting the second cam.

9. The lens barrel according to claim 7, wherein the cam frame has a thick-walled part provided on the image plane side of the first cam and forming a cam surface of the first cam and a thin-walled part provided on a subject side of the first cam and having a smaller thickness than that of the thick-walled part.

10. The lens barrel according to claim 7, wherein the moving frame has a reinforcing part that is provided further toward a subject side than a region opposing the second cam on the cam frame side and has a larger thickness than that of other portion thereof.

11. The lens barrel according to claim 1, wherein an angle $\alpha$, which is formed by two mutually opposite cam surfaces constituting the first cam, is smaller than an angle $\beta$, which is formed by two mutually opposite cam surfaces constituting the second cam.

12. The lens barrel according to claim 11, wherein the cam frame has a thick-walled part provided on the image plane side of the first cam and forming a cam surface of the first cam and a thin-walled part provided on a subject side of the first cam and having a smaller thickness than that of the thick-walled part.

13. The lens barrel according to claim 11, wherein the moving frame has a reinforcing part that is provided further toward a subject side than a region opposing the second cam on the cam frame side and has a larger thickness than that of other portion thereof.

14. The lens barrel according to claim 1, wherein the cam frame has a thick-walled part provided on the image plane side of the first cam and forming a cam surface of the first cam and a thin-walled part provided on a subject side of the first cam and having a smaller thickness than that of the thick-walled part.

15. The lens barrel according to claim 14, wherein
the moving frame has a reinforcing part that is provided further toward the subject side than a region opposing the second cam on the cam frame side and has a larger thickness than that of other portion thereof.

16. The lens barrel according to claim 1, wherein
the moving frame has a reinforcing part that is provided further toward a subject side than a region opposing the second cam on the cam frame side and has a larger thickness than that of other portion thereof.

* * * * *